H. C. HARRISON.

RADIATOR CELL STRUCTURE.

APPLICATION FILED DEC. 15, 1914.

Reissued Feb. 15, 1916. 14,072.

Witnesses

Byron B. Collings.

M. C. Hanrahan.

Inventor

Herbert C. Harrison, by

T. Weitherspoon

Attorney

UNITED STATES PATENT OFFICE.

HERBERT CHAMPION HARRISON, OF LOCKPORT, NEW YORK, ASSIGNOR TO HARRISON MANUFACTURING COMPANY INC., OF LOCKPORT, NEW YORK, A CORPORATION OF NEW YORK.

RADIATOR-CELL STRUCTURE.

14,072. Specification of Reissued Letters Patent. Reissued Feb. 15, 1916.

Original No. 1,076,115, dated October 21, 1913, Serial No. 729,117. Application for reissue filed December 15, 1914. Serial No. 877,434.

*To all whom it may concern:*

Be it known that I, HERBERT CHAMPION HARRISON, a subject of the King of Great Britain, residing at Lockport, in the county of Niagara and State of New York, have invented certain new and useful Improvements in Radiator-Cell Structures; and I do hereby declare the following to be a full, clear, and exact description of the invention, such as will enable others skilled in the art to which it appertains to make and use the same.

This invention relates to cell construction for radiators, and has for one of its objects to produce radiator units consisting of a plurality of rows of cells separated by a single partition in a manner less expensive and with greater facility than has been heretofore proposed.

With this and other objects in view, the invention consists in the novel details of construction and combinations of parts more fully hereinafter disclosed and particularly pointed out in the claims.

Figure 1:
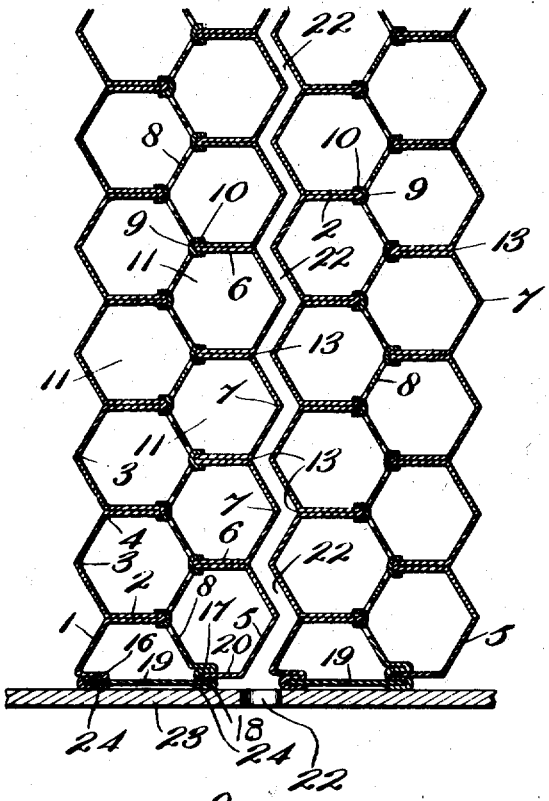
Figure 2:
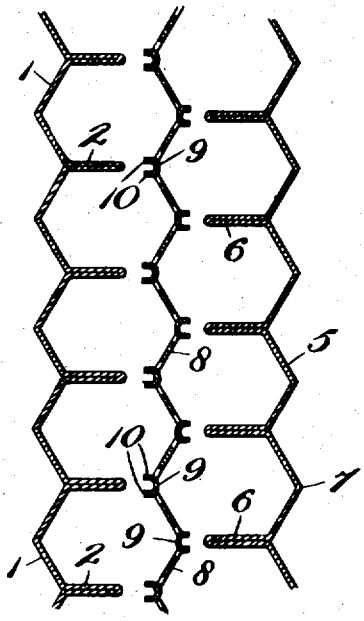
Figure 4:
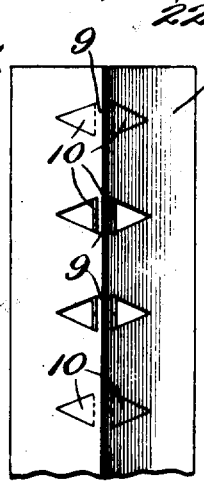
Figure 3:
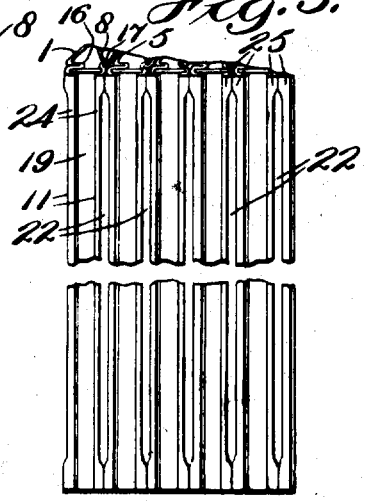
Figure 5:
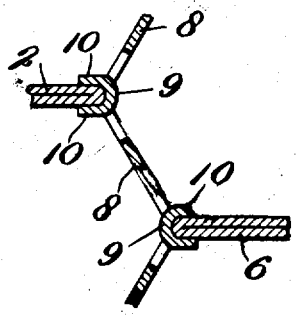

Referring to the accompanying drawings forming a part of this specification in which like numerals designate like parts in all the views:—Figure 1 is a sectional view in elevation illustrating a pair of units made in accordance with my invention; Fig. 2 is a view similar to Fig. 1, showing the parts of one of the units in their disassembled condition; Fig. 3 is an end elevational view of a plurality of units illustrating the offset ends of the plates in order to form the water passages between the units; Fig. 4 is an elevational view of one of the plates separating the double row of cells of which a unit is composed; and Fig. 5 is an enlarged detail sectional view illustrating the formation of the cells.

In carrying out my invention, I fold a metal plate 1 upon itself to form the partition or plait 2, then bend the metal outwardly at an angle of 120 degrees to said partition 2, and at the point 3, a distance equal to the length of the partition 2, I bend the metal inwardly at an angle of 120 degrees, while at the point 4, at a distance again equal to the length of the partition 2, I again form a second partition 2, and repeat the foregoing operations until a sufficient number of partitions have been formed to provide the requisite number of cells. I further take a similar plate 5 and similarly form partitions 6 and outward bends 7 therein as will be clear from the drawings. I also provide a division plate 8 which is bent inwardly and outwardly to itself at angles of 120 degrees at the points 9, and along the bent edges at intervals, I suitably perforate the said plate 8 to form the projecting ears 10, as shown. The said plate 8 is located between the two plates 1 and 5 in such manner that the partitions 2 and 6 fit respectively between the ears or projections 10 on the plate 8, and thus form the double row of cells or units 11, as shown. The projecting angles 7 of the plates alternate with the inwardly turned angles 13, so as to form a zigzag surface. The ends of the plate 1 may be first folded upon itself and then reversely folded in order to form the pocket 16, and the end of the plate 8 may be folded upon itself, then reversely folded to form the pocket 17, and again folded in an opposite direction to form the pocket 18, as best shown in Fig. 1. In the pockets 16, and 18 thus formed, I may fit the strip 19, and in the pocket 17, I may fit the bent over end 20 of the plate 5. A similar unit made from three similar plates may be assembled in close relation to the first mentioned unit, whereupon the projecting angles 7 of the one unit will come opposite the inwardly extending angles 13 of the other unit to form the zigzag water passage 22, as shown. The said zigzag water passage is, of course, longer than any straight passage could be between the same cells, and therefore the water is subjected to a greater cooling action in this construction than would otherwise be the case. Further, the fact that there is only a single thickness of metal 8 between the cells 11, enables the structure to be lighter than is the case when a double thickness is employed, and the partitions 2 and 6 combined with the ears 10 afford an exceedingly strong and compact structure. The said plates 1, 5 and 8 when assembled, may be secured together in any suitable manner, a convenient way being the dipping of the edges of the same in a bath of solder and the said units, when formed, may be secured to header plates 23 in any suitable manner, as by soldering on the edges 24 of the plates, as will be readily understood from the drawings, or said plates 23 may be omitted in the manner well known, as may be desired.

The individual units may be separated in any suitable manner, as by placing spacing material between them or the extreme edges may be off-set as illustrated at 25 in Fig. 3, in order to form the water passages 22.

It is obvious that those skilled in the art may vary the details of construction as well as the arrangement of parts without departing from the spirit of my invention and therefore I do not wish to be limited to the above disclosure except as may be required by the claims.

What I claim is:—

1. In a radiator, a unit comprising a pair of opposed zig-zag outer plates folded to provide partitions at their reëntrant portions, and an intermediate zig-zag division plate engaging said partitions to provide two rows of polygonal cells separated by a single thickness of metal.

2. In a radiator, a unit comprising a pair of opposed zig-zag outer plates folded to provide partitions at their reëntrant portions, and an intermediate division plate provided with pairs of projections extending alternately from its opposite faces for engaging said partitions of the adjacent plates, thereby forming two rows of polygonal cells separated by a single thickness of metal.

3. In a radiator, a unit comprising a pair of opposed zig-zag outer plates folded to provide partitions at their reëntrant portions, an intermediate zig-zag division plate engaging said partitions to provide two rows of polygonal cells separated by a single thickness of metal, and means for closing the end cells of the said rows.

4. In a radiator, a unit comprising a pair of opposed zig-zag outer plates folded to provide partitions and provided with end pockets, a zig-zag division plate engaging said partitions to provide two rows of polygonal cells separated by a single thickness of metal, and a closing strip extending within said pockets for closing the end cells of said rows.

5. In a radiator, the combination of a plurality of units each comprising a pair of opposed zig-zag outer plates folded to provide partitions at their reëntrant portions, an intermediate zig-zag division plate engaging said partitions to provide two rows of polygonal cells separated by a single thickness of metal, and means for spacing said units apart with the projecting portions of the zig-zag outer walls of the several units opposed to the reëntrant portions of the zig-zag walls of the adjacent units.

6. In a radiator the combination of a pair of radiator units each composed of a pair of zig-zag outer plates separated by a zig-zag division plate of a single thickness of metal to form a double row of cells; and means to separate said units to form a zig-zag water passage between them, substantially as described.

7. A radiator unit comprising a pair of zig-zag outer plates and a zig-zag intermediate plate of a single thickness contacting with said outer plates to form a double row of cells, substantially as described.

8. A radiator section made up of a plurality of radiator units each unit comprising a pair of opposing zig-zag outer plates forming partitions constituting cell walls, and each provided with an intermediate zig-zag division plate of a single thickness engaging said partitions to provide a double row of polygonal cells separated by a single thickness of metal, and the outer plates of adjacent units being spaced apart to form zig-zag water passages, substantially as described.

In testimony whereof I affix my signature in the presence of two witnesses.

HERBERT CHAMPION HARRISON.

Witnesses:

DANIEL TICE,

VERNA C. ECKHARDT.